July 7, 1970 T. E. SPENCE ET AL 3,519,317

CLUTCH RELEASE BEARING

Filed Oct. 15, 1968

INVENTORS:
RAYMOND A. GUYER
THOMAS E. SPENCE
BY Howson & Howson
ATTYS

United States Patent Office 3,519,317
Patented July 7, 1970

---

3,519,317
CLUTCH RELEASE BEARING
Thomas E. Spence, Radnor, and Raymond A. Guyer, Malvern, Pa., assignors to SKF Industries, Inc., King of Prussia, Pa., a corporation of Delaware
Filed Oct. 15, 1968, Ser. No. 767,732
Int. Cl. F16c *19/10*
U.S. Cl. 308—233                          5 Claims

---

ABSTRACT OF THE DISCLOSURE

A clutch release bearing comprising inner and outer rings spaced apart to define an annular space, a plurality of rolling elements in the annular space between the rings, a cage for spacing the rolling elements, an outer circumferentially extending cup member secured at one peripheral edge to one of said rings and having an inwardly directed flange at its opposite peripheral edge confronting the outer face of the other ring, and a lubricant retention shell made of a flexible non-metallic material having a portion spanning the annular space and having at least one radially inwardly directed lip engaging between the flange of the cup member and the outer face of the other ring.

---

Figure 1:
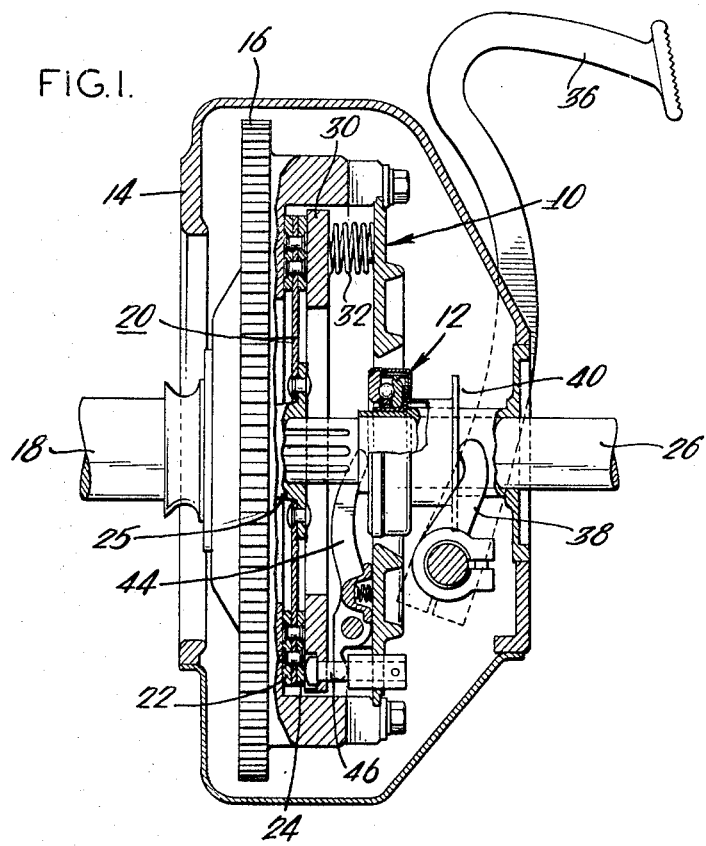

The present invention relates to improvements in rolling bearing assemblies and more particularly to a thrust bearing used in vehicles as clutch release bearings.

There are several disadvantages and drawbacks in present clutch release bearing assemblies which the present invention is designed to overcome. For example, it has been found that the most common factor contributing to failure of the thrust-type clutch bearing is associated with lubrication, spalled raceways or balls rarely being the cause of failure of this type of bearing. These failures are indicative of metal fatigue and since the normal loads and speeds on the bearing in an automotive clutch are at comparatively low levels, failure due to metal fatigue is thus not a serious factor. Evidence of the lubrication problem is the fact that when this type of bearing has been in normal use a period of time there is severe pocket wear in the metallic retainer and a loss of ball retention, metallic particle debris being associated with indications of overheating.

Accordingly, a major problem in prior bearings of this type is the loss of lubricant during operation which results in the above-identified wear characteristics and also creates a "noise" problem. Even in cases where there may be little actual lubricant loss, it has been found that the lubricant redistributes unfavorably due to the rotational forces. The effect is nevertheless the same to cause wear and create a noise factor.

With the foregoing in mind, the present invention provides an improved bearing assembly construction designed to improve the lubricant retaining characteristics; that is, hold the lubricant in close proximity to the balls and prevent leakage. The assembly further is characterized by novel features of construction and arrangement whereby noise is reduced considerably during normal operation and particularly during "spindown" after disengagement of the clutch. More specifically, the bearing assembly comprises inner and outer rings which are spaced apart to define an annular space for a plurality of balls, one of the rings being a stationary race and the other rotating, a plurality of balls in the annular space between the rings and a ball spacer made of a lightweight molded composition adapted to expose the ball surface to the lubricant in the annular space between the rings. The assembly further includes a grease retaining shell made of a flexible non-metallic material such as nylon or delrin which has a generally cylindrical wall spanning the space between the rings, a radially outwardly directed inner flange confronting and engaging the inner wall of the rotating ring to provide a seal therebetween, and a larger radially inwardly directed outer flange in running engagement with the outer face of the stationary ring by an outer retaining cup. The grease retaining shell also includes a circumferentially extending rib engaging the outer side wall of the stationary ring additionally confining the lubricant near the balls.

The shell thus functions as a seal to prevent a weight loss of lubricant from the bearing through what in prior assemblies was a metal-to-metal joint between the outer cup and rotating thrust washer. It also traps and holds the lubricant against the balls. The rolling bearing assembly of the present invention has particular advantages in clutch assemblies since it retains the lubricant within the bearing obviating the problem of clutch slippage characteristic of prior assemblies occasioned by leakage of lubricant which accumulated on the clutch disc facings. Another feature of the present invention is that for a comparable size bearing the assembly of the present invention is lighter and hence, by reason of a weight reduction in the rotating parts, there is reduced slippage and clutch finger wear as the bearing is accelerated during clutch engagement.

Figure 2:
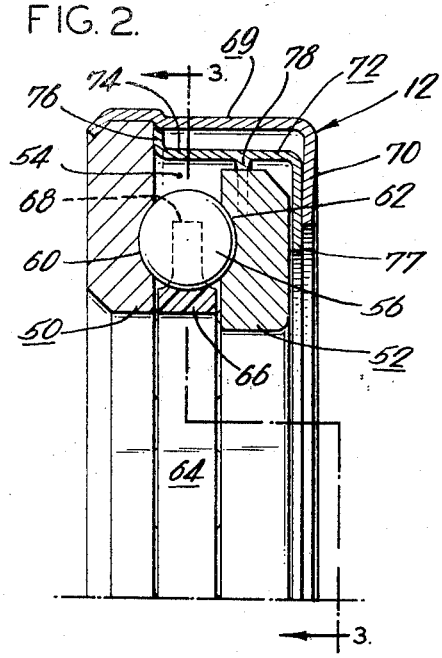
Figure 3:
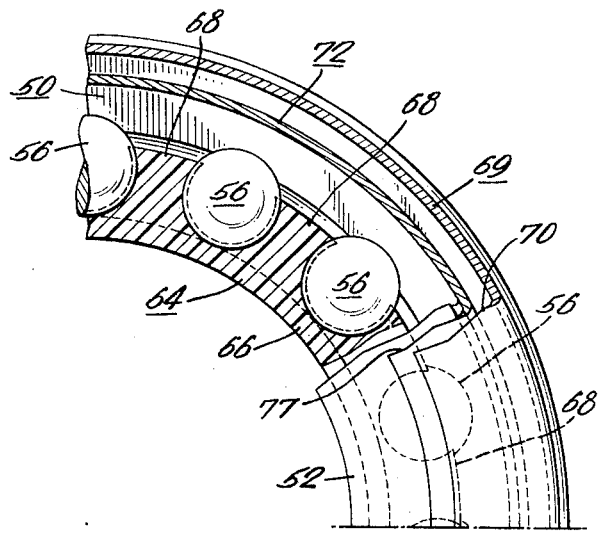

These and other objects of the present invention and various features and details of a rolling bearing assembly in accordance with the present invention are hereinafter more fully set forth with reference to the accompanying drawing wherein FIG. 1 is a transverse sectional view of a clutch assembly incorporating a clutch release bearing in accordance with the present invention;

FIG. 2 is an enlarged fragmentary sectional view of a rolling bearing assembly in accordance with the present invention; and FIG. 3 is a sectional view taken on lines 3—3 of FIG. 2.

Referring now to the drawing and particularly to FIG. 1 thereof there is illustrated a conventional clutch assembly broadly designated by the numeral 10 incorporating a ball bearing assembly 12 constructed in accordance with the present invention. In the present instance the ball bearing assembly 12 functions as the release bearing in the clutch assembly. However, it is to be understood that the improved bearing construction has other useful applications.

The clutch assembly 10 which is of conventional design includes a housing 14, a flywheel 16 rotatably mounted in the housing, which is suitably secured to the inner end of the engine crank shaft 18. The assembly further includes a clutch disc 20 which mounts on opposite sides of its outer peripheral edge, inner and outer annular disc facings 22 and 24 suitably secured thereto by means of conventional rivets, the clutch disc 20 being secured at its inner edge to a hub 25 mounted on the splined portion of the clutch shaft 26. An annular clutch pressure plate 30 is provided which is normally biased by a plurality of circumferentially spaced compression springs 32 to press the clutch disc facing 22 into pressure-applying relation with the inner face of the flywheel 16. The assembly further includes a pivotally mounted foot pedal 36 which in turn mounts a release fork 38 adapted to engage the radial shoulder of a sleeve 40 on which is mounted the clutch release bearing assembly 12. Pivotally mounted release levers 44 are adapted to be pivoted in a counterclockwise direction upon movement of the sleeve 40 to the left when the foot pedal is depressed whereby the outer tip of the release levers engage the outer axial end of the sleeve mounting the headed studs 46 connected to the pressure plate, thus the pressure plate is displaced to the right to release the pressure-applying relation of the pressure plate against the clutch disc facings. Of course, upon release of the foot pedal the compression springs return the pressure plate against the facings to engage the clutch.

Considering just briefly the operation of the clutch which is conventional, depression of the clutch foot pedal 36 pivots the release fork 38 in a counter-clockwise direction whereby it engages the retainer sleeve 40 and moves the release bearing assembly 12 to the left. The release levers 44 supported in the clutch move the pressure plate against the bias of the compression springs whereby the clutch disc 20 and its facings are freed from the friction grip of the flywheel face and the pressure plate. Accordingly, power is then released from the change speed gear by a splined hub axially floating on the splined clutch shaft.

In accordance with the present invention, the clutch release bearing 12 comprises a pair of inner and outer rings 50 and 52 respectively which are spaced apart to define an annular space 54 for a plurality of balls 56 which ride in the raceways, in the present instance, arcuate circumferentially extending grooves 60 and 62 in the rings 50 and 52 respectively. The ring 52 is a stationary ring whereas the ring 50 rotates. The balls are maintained in circumferentially spaced relation by means of a ball separator 64 of one piece construction which in the present instance is made of a light weight molded composition and includes a circumferentially extending annular portion 66 spanning the annular space and a plurality of radially projecting fingers 68 which are contoured to receive the balls as shown in FIG. 3.

In accordance with the present invention, the bearing includes an outer cup member 69 which at one axial end is engaged with the outer edge of the ring 50 and at its opposite end has an inwardly directed flange 70 which is inwardly divergent as illustrated slightly from a true radial line. The assembly further includes a grease retention shell 72 made of a flexible non-metallic material such as nylon or delrin comprising a generally cylindrical portion 74 having a portion spanning the annular space, an outwardly directed lip 76 at one axial end which presses against the inner face of the ring 50 and a radially inwardly directed flange 77 at its opposite end which extends to a point overlying the outer face of the ring 52. The retaining shell also includes a circumferentially extending radially inwardly directed rib 78 which seats on the outer circumferential face of the ring 52. Grease retaining shell 72 is compressed along its length 74 between the inside face of outer cup member 69 and the inside face of outer race 50 so that lip 76 of grease retention shell 72 is in tight sealing engagement with said inside face of the outer race. Grease retention shell 72 rotates with outer race 50.

As noted above, the specific construction of the bearing assembly of the present invention seals against leakage of lubricant from the bearing assembly which in a clutch assembly is important to obviate the problem of clutch slippage. Additionally, the bearing assembly of the present invention is comprised of relatively few parts so that it is economical to manufacture and is a light weight assembly thereby reducing slippage and finger wear as the bearing is accelerated during clutch operation.

While a particular embodiment of the present invention is described herein, it is not intended to limit the invention, and changes and modfications may be made therein within the scope of the following claims.

We claim:
1. A clutch release bearing comprising inner and outer rings spaced apart to define an annular space, a plurality of rolling elements in the annular space between the rings, a cage for spacing the rolling elements, an outer circumferentially extending cup member secured at one peripheral edge to one of said rings and having an inwardly directed flange at its opposite peripheral edge confronting the outer face of the other ring, and a lubricant retention shell made of a flexible non-metallic material having a portion spanning the annular space and having at least one radially inwardly directed lip engaging between the flange of the cup member and the outer face of the other ring.

2. A clutch release bearing as claimed in claim 1 wherein said rolling elements comprise balls.

3. A clutch release bearing as claimed in claim 2 wherein said cage which is of one piece construction and made of a light weight molded composition including a circumferentially extending annular portion spanning said annular space and a plurality of radially projecting fingers which are contoured to snugly embrace the balls.

4. A clutch release bearing as claimed in claim 1 wherein said cup member flange is inwardly divergent from a true radial line to urge the lubricant retention shell against the outer face of said other ring.

5. A clutch release bearing as claimed in claim 1 wherein said lubricant retention shell includes a circumferentially extending radially inwardly directed rib which seats on the outer circumferential face of the other ring.

References Cited
UNITED STATES PATENTS
3,365,040   1/1968   Pitner _____ 192—98

MARTIN SCHWADRON, Primary Examiner

F. SUSKO, Assistant Examiner